United States Patent [19]

Dahlerud

[11] Patent Number: 5,448,426
[45] Date of Patent: Sep. 5, 1995

[54] AUTOMATIC UPGRADE OF CODE FROM TAPE CARTRIDGE

[75] Inventor: Ole C. Dahlerud, Oslo, Norway

[73] Assignee: Tandberg Data A/S, Oslo, Norway

[21] Appl. No.: 183,137

[22] Filed: Jan. 18, 1994

Related U.S. Application Data

[63] Continuation of Ser. No. 776,214, Oct. 15, 1991, abandoned.

[51] Int. Cl.⁶ .................... G11B 15/18; G11B 5/02
[52] U.S. Cl. ........................ 360/69; 360/27; 360/74.5; 360/25
[58] Field of Search ............ 360/74.5, 72.2, 69, 360/14, 74.5, 71, 27, 25

[56] References Cited

U.S. PATENT DOCUMENTS

| | | | |
|---|---|---|---|
| 4,492,993 | 1/1985 | Otis | 360/74.5 |
| 4,843,490 | 6/1989 | Haragushi | 360/69 |
| 5,327,305 | 7/1994 | Thomas | 360/69 |

FOREIGN PATENT DOCUMENTS

| | | |
|---|---|---|
| 0347074 | 12/1989 | European Pat. Off. . |
| 0489227 | 6/1992 | European Pat. Off. . |
| WO90/05339 | 5/1990 | WIPO . |

*Primary Examiner*—William L. Sikes
*Assistant Examiner*—Tiep H. Nguyen
*Attorney, Agent, or Firm*—Hill, Steadman & Simpson

[57] ABSTRACT

A system detects a pattern of holes in a magnetic medium for determining a characteristic of the tape, such as the type of data contained on the tape. A memory device, such as a FLASH memory, is automatically updated when a predetermined pattern is detected. The updating is performed using a read operation without the need for a host system.

9 Claims, 1 Drawing Sheet

AUTOMATIC UPGRADE OF CODE FROM TAPE CARTRIDGE

This is a continuation of application Ser. No. 07/776,214, filed Oct. 15, 1991 and abandoned on Mar. 15, 1994.

BACKGROUND OF THE INVENTION

The invention relates to a system for downloading micro code to a memory device, particularly FLASH memory.

In high speed magnetic tape reading and writing units ("tape streamers"), code has previously been stored in memory, typically an EPROM, PROM or ROM. Each of these memory devices are well known in the art. New devices, however, are changing from these conventional memory devices to devices using FLASH memory. The primary advantage of using FLASH memory is the easy upgrade necessary to change the prior micro code to the new code. The new code can be loaded into the FLASH memory through several different paths. A natural path would be to read a file into the FLASH memory. This, however, requires the use of a read command from a host system.

A problem occurs when a customer first believes data is to be read onto a standard data cartridge and tape drive, and then believes this same data is code data for its FLASH memory. The data is then incorrectly transferred from the tape to the FLASH memory. To enable upgrade of large inventories of streamers with new codes, it would be desirable if it would be sufficient to apply power only to the drive and insert the cartridge containing the upgrade code. This would mean, however, that the drive would have to undertake a check read of each inserted cartridge to check for the possibility of that cartridge containing an upgrade code. This process is time-consuming, as well as repetitive, when data is being read when it is not required.

It is a further problem in this technology that tapes begin their code with some special data pattern indicating to the tape drive that this code is to be read into its memory. The problem arises on a data cartridge in which the initial code contains the same pattern for transferring the code to the memory. The tape drive will automatically begin the transfer of data once the pattern is detected.

SUMMARY OF THE INVENTION

It is, therefore, an object of the invention to provide a system for reading a code from a tape to a memory device.

It is a further object of the invention to provide a system for reading a code from the tape to the memory device without a required read command from a host system.

It is a further object of the invention to provide a recognition of the tape to signify that the code following is to be read into the memory device.

The system, therefore, eliminates the problem of erroneously reading and storing data by first determining whether the tape is encoded with data having a predetermined characteristic. A perforation pattern at the beginning of the magnetic medium, preceding the data on the magnetic medium, is sensed to identify the presence of the characteristic on the magnetic medium. If the pattern identifies the magnetic medium as containing encoded data to be read, then the data may be transferred. If the pattern identifies the data on the magnetic medium as some other type of data, the data is not erroneously transferred and, therefore, does not require storage, transfer or additional reading time.

DESCRIPTION OF THE PREFERRED EMBODIMENTS

Figure 1:
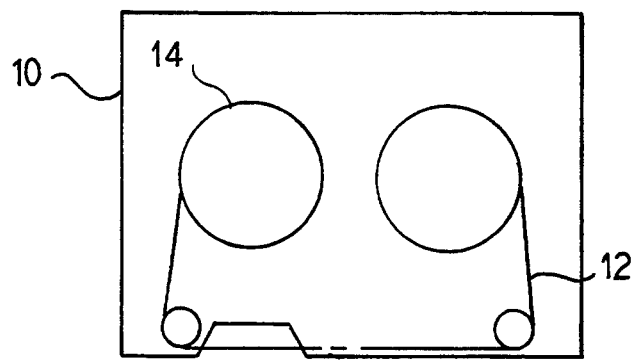
FIG. 1 is a tape cartridge and tape as used in the present invention.
Figure 2:
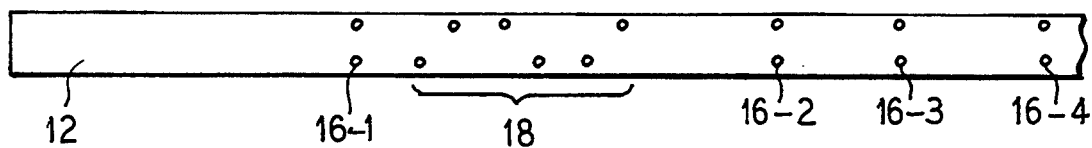
FIG. 2 shows a pattern of identification holes on a tape as used in the present invention.
Figure 3:
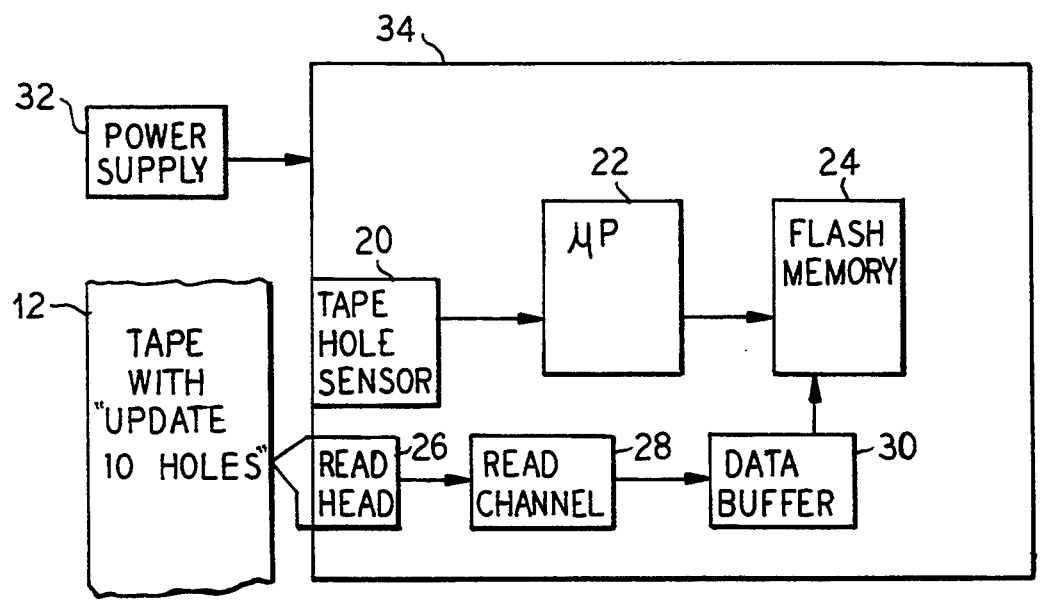
FIG. 3 shows the apparatus of the instant invention for reading code from a tape onto a memory device.

FIG. 1 shows a tape cartridge 10 as is well known in the art with a magnetic tape 12 containing update data. The tape 12 as shown in FIG. 2 is manufactured with a series of small holes at each end of the tape 12 to enable the tape drive to stop recording and to stop tape travel before the tape 12 runs off the hubs 14 as shown in FIG. 1. The sets of holes 16-1, 16-2, 16-3 and 16-4 as shown in FIG. 2 are a part of ¼ inch cartridges at the beginning of the tape 12 to designate different attributes of the tape 12, such as the type of tape or the length of the tape. The present invention defines a series of holes which form a pattern 18 as shown in FIG. 2. The pattern 18 consists of six tape identification holes with upper or lower positions on the tape 12. Therefore, 64 different codes are possible from the combinations of holes which form pattern 18. One of these patterns 18 is reserved for identifying a FLASH update function such that the pattern 18 is recognized during the loading of the tape 12. When the pattern 18 is detected, an automatic read process is started, and automatic updating of the FLASH memory is implemented. This unique pattern 18 is only used for tapes containing code to be downloaded into a FLASH memory 24 of a tape drive 34 as shown in FIG. 3. Therefore, it is not possible to mix a tape cartridge loaded with normal data with a tape cartridge containing FLASH memory code data. The two cartridges themselves will be physically different in that the tapes will contain different hole patterns 18.

FIG. 3 shows the tape 12 with a tape hole sensor 20, such as an optical sensor system which emits light directed to the tape 12 and senses holes in the tape 12 when the emitted light passes through the holes in the tape 12. The position of the holes on the tape 12 enables the drive 34 to distinguish between the beginning and the end of the tape 12. The drive 34 may also detect different tape types based on the pattern 18. When the FLASH update pattern is detected, the tape drive 34 itself detects that a tape 12 containing FLASH update data is installed. The actual reading of the tape 12 will, therefore, only occur if the pattern 18 is detected.

FIG. 3 shows how the apparatus of the instant invention is interconnected to first detect holes in the tape 12 using the sensor 20 wherein a microprocessor 22 determines when code data is to be transferred to FLASH memory 24 of the drive 34. The microprocessor 22 determines that the FLASH memory 24 is to be updated when the pattern 18 as shown in FIG. 2 is detected by the sensor 20. When this occurs, code data is loaded from the tape 12 via a read head 26, a read channel 28 and a data buffer 30 to the FLASH memory 24. In order to achieve the above detection, it is necessary only to supply power from the power supply 32, with no other special steps, once a cartridge is present in the drive 34.

Requiring the tape 12 to have a unique hole pattern 18 indicating the tape 12 is a FLASH update tape provides an additional layer of protection since it requires the tape 12 itself, rather than the code data, to contain the special pattern 18. This allows for actual reading to occur only when the special pattern 18 is detected. Although FIG. 2 illustrates a specific pattern 18, it is understood that any sequence of holes in any combination of upper and lower positions may represent any predetermined characteristic of the tape 12.

Although various minor changes and modifications might be proposed by those skilled in the art, it will be understood that I wish to include within the claims of the patent warranted hereon all such changes and modifications as reasonably come within my contribution to the art.

I claim as my invention:

1. A data identification system for use in a magnetic medium drive, the system comprising:
    a magnetic medium having data encoded thereon having a data characteristic wherein said data characteristic identifies FLASH update data;
    a perforation pattern at a beginning of said magnetic medium, preceding said data, including at least one perforation identifying a presence of said data characteristic;
    sensor means capable of sensing said perforation pattern and generating an electrical signal identifying the presence of said data characteristic; and
    reading means capable of reading said data on said magnetic medium and transferring said data to a memory means in response to identifying said data characteristic wherein said sensing, said reading and said transferring are performed without the reading means being connected to any other external connection except to a power supply.

2. The data identification system according to claim 1 wherein said perforation pattern is a plurality of pre-manufactured holes punched through said medium.

3. The data identification system according to claim 1 wherein said sensor means comprises optical sensing elements for performing the sensing of said perforation pattern.

4. The data identification system according to claim 1 further comprising:
    disenabling means for preventing said data from being transferred to said memory means when a different perforation pattern identifying a different data characteristic is present.

5. The data identification system according to claim 4 wherein said memory means is a FLASH memory.

6. A method for identifying data for use in a magnetic medium drive, the method comprising the steps of:
    encoding data having a data characteristic on a magnetic medium wherein said data characteristic identifies FLASH update data;
    preceding said data with a perforation pattern at a beginning of said magnetic medium wherein at least one perforation identifies a presence of said data characteristic;
    sensing said perforation pattern and generating an electrical signal identifying the presence of said data characteristic; and
    said data on said magnetic medium and transferring said data to a memory means in response to identifying said data characteristic wherein said sensing, said reading and said transferring are performed by a reading means connected to no other external connection except to a power supply.

7. The method according to claim 6 wherein said reading step is performed optically.

8. The method according to claim 6 further comprising the step of:
    preventing said data from being transferred to said memory means when the perforation pattern identifies a different data characteristic.

9. The method according to claim 6 further comprising the step of:
    reserving a perforation pattern so as to indicate a FLASH update function.

* * * * *